United States Patent
Naghi et al.

(10) Patent No.: US 6,523,967 B2
(45) Date of Patent: Feb. 25, 2003

(54) ELECTROLUMINESCENT APPARATUS FOR ILLUMINATING A PORTABLE ELECTRONIC OR COMPUTING DEVICE

(75) Inventors: David Naghi, Los Angeles, CA (US); Herschel Naghi, Los Angeles, CA (US); Eric A. Hanscom, Los Angeles, CA (US)

(73) Assignee: Technology Creations, Inc., Los Angeles, CA (US)

( * ) Notice: Subject to any disclaimer, the term of this patent is extended or adjusted under 35 U.S.C. 154(b) by 77 days.

(21) Appl. No.: 09/847,103

(22) Filed: May 1, 2001

(65) Prior Publication Data

US 2002/0163797 A1 Nov. 7, 2002

(51) Int. Cl.[7] .................................................. F21V 9/16
(52) U.S. Cl. ......................... 362/84; 362/109; 362/253
(58) Field of Search ............................. 362/84, 85, 109, 362/253, 812

(56) References Cited

U.S. PATENT DOCUMENTS

| | | | |
|---|---|---|---|
| 1,651,307 A | 11/1927 | Wilkinson | |
| 3,065,339 A | 11/1962 | Fahey, Jr. et al. | 240/25 |
| D238,959 S | 2/1976 | Kurokawa et al. | D48/20 F |
| D251,687 S | 4/1979 | Kurokawa | D48/20 F |
| 4,561,044 A | 12/1985 | Ogura et al. | 362/84 |
| 4,910,775 A | 3/1990 | Yves et al. | 380/25 |
| 5,120,057 A | 6/1992 | Kitaue | 273/85 G |
| 5,122,937 A | 6/1992 | Stoudemire | 362/109 |
| 5,122,941 A | 6/1992 | Gross et al. | 362/276 |
| 5,136,477 A | 8/1992 | Lemmey | 362/198 |
| 5,137,277 A | 8/1992 | Kitaue | 273/85 G |
| 5,150,899 A | 9/1992 | Kitaue | 273/85 G |
| 5,183,325 A | 2/1993 | Hurdle | 362/109 |
| 5,379,201 A | 1/1995 | Friedman | 362/191 |
| 5,528,248 A | 6/1996 | Steiner et al. | 342/357 |
| D377,840 S | 2/1997 | Chang | D26/62 |
| 5,615,945 A | 4/1997 | Tseng | 362/226 |
| 5,708,840 A | 1/1998 | Kikinis et al. | 395/281 |
| 5,725,428 A | 3/1998 | Achmüller | 463/20 |
| 5,746,501 A | 5/1998 | Chien | 362/103 |
| 5,822,546 A | 10/1998 | George | 395/281 |
| 5,980,060 A | 11/1999 | Chien | 362/103 |
| D418,240 S | 12/1999 | Sherman | D26/63 |
| 6,056,425 A | * 5/2000 | Appelberg | 362/493 |
| 6,057,814 A | 5/2000 | Kalt | 345/58 |
| 6,082,867 A | * 7/2000 | Chien | 313/512 |
| 6,166,496 A | 12/2000 | Lys et al. | 315/316 |
| 6,273,581 B1 | 8/2001 | Neiser | 362/109 |
| 6,280,053 B1 | * 8/2001 | Chien | 362/157 |

FOREIGN PATENT DOCUMENTS

JP          11008067 A          6/1997

OTHER PUBLICATIONS

Amazon.com product web page printout for "Adventure Book Light and Flashlight" by Lumatec; http://www.amazon.com/exec/obidos/ASIN/b00000IJZM/104–9549104–0986847; printed Mar. 2, 2000.

(List continued on next page.)

*Primary Examiner*—Sandra O'Shea
*Assistant Examiner*—Ali Alavi
(74) *Attorney, Agent, or Firm*—Procopio, Cory, Hargreaves & Savitch, LLP

(57) ABSTRACT

An electroluminescent ("EL") illumination apparatus for illuminating an object associated with a portable electronic or computing device having a port in electrical connection with at least one power source. The EL illumination apparatus includes at least one electroluminescent (EL) member to illuminate an object associated with the portable electronic or computing device, and a plug connected to at least one EL member for plugging the apparatus into the port of the portable electronic or computing device for powering at least one EL member by at least one power source. A method of using the apparatus includes plugging the plug of the EL apparatus into the port of the portable electronic or computing device, and lighting at least one EL member with the power source to illuminate the object associated with the portable electronic or computing device.

62 Claims, 4 Drawing Sheets

OTHER PUBLICATIONS

Book light product internet web page printout; http://store1.yimg.com/I/parksherman_1550_902141; printed Mar. 2, 2000.

"Designed Halogen Lamps With Multiple Features," *Taiwan Lighting*, Feb. 1997, p. 69.

FlyLight™ Notebook USB Light, Kensington Products; http://www.kensington.com/products/pro_cas_d1334.html, Printed Feb. 15, 2001.

Igo.com product web page printout for "NBL–100 Notebook Light" by Interex; http://www.igo.com/cgi–bin/ncommerce3/ProductDisplay?prmenbr=1&prrfnbr–522530; printed Jul. 21, 2000.

"LyTec™ Wire Design Kit, Designer's Manuel," Electroluminescent Industries, Ltd. (Jun. 1999).

Sierra Gold Marketing "SGM28367" Clip On Light product web page printout; http://www.sgm.simplenet.com/boutique/special/sgm28367.htm; printed Mar. 2, 2000.

"The Ittybitty Book Light" internet web page printout; http://www.zelco.com/10013.jpg; printed Mar. 2, 2000.

"Ultimate Palmtop Computer Lights®" internet web page printout; http://www.std.com/sfl/3.pct.html; printed Mar. 2, 2000.

www.coolneon.com.

* cited by examiner

ELECTROLUMINESCENT APPARATUS FOR ILLUMINATING A PORTABLE ELECTRONIC OR COMPUTING DEVICE

FIELD OF THE INVENTION

The present invention is in the field of lighting devices for portable electronic or computing devices.

BACKGROUND OF THE INVENTION

Compact electronic devices with a viewing screen or keypads have become very common and quite popular. Such devices have been popular for a number of years in connection with hand-held, portable, battery-powered gaming devices. A well-known example of such a device, that has sold millions of units, is the GAME BOY™ device sold by Nintendo. More recently, other electronic devices have also included viewing screens, such as portable video cameras and cellular phones. And, of course, portable computers have long had viewing screens. Although the complexity and cost of such devices can vary greatly, it is common for such devices to use a generally flat, liquid crystal display screen or other types of flat display screens.

Flat, liquid crystal display screens work very well in a well-lit area. However, when such devices are used in dimly lit areas, or at night, it can be difficult, if not impossible, for a user to see anything in the viewing screen. This problem is magnified when such a screen is used in a device that is meant to be portable, and especially when it is a small device.

If a portable device is sufficiently complex, and generally more expensive, such as a portable laptop computer, the device can include lighting within the actual device. An example of such lighting is a portable laptop computer with a backlit screen. However, this solution is not always economically practical, nor does it necessarily solve the problem in smaller devices. Also, if an electronic device does not have a viewing screen, then this option is not even available.

To solve this problem, especially in connection with hand-held, portable, battery-powered gaming devices, a number of different solutions have been proposed. Such solutions have typically included add-on devices with their own source of electrical power. These devices can be designed to fit onto the electronic device or be designed for use in connection with the electronic device. However, because such devices use their own source of electrical power, they tend to be rather bulky and heavy. In addition, the second source of electrical power increases cost and creates the possibility of another source of power failure.

Accordingly, there is a long felt need for a simple, economical, device that can illuminate portable electronic or computing devices, or objects associated therewith without the drawbacks associated with prior illumination devices.

SUMMARY OF THE INVENTION

An aspect of the invention involves an electroluminescent ("EL") illumination apparatus for illuminating an object associated with a portable electronic or computing device having a port in electrical connection with at least one power source. The EL illumination apparatus includes at least one electroluminescent (EL) member to illuminate an object associated with the portable electronic or computing device, and a plug connected to at least one EL member for plugging the apparatus into the port of the portable electronic or computing device for powering at least one EL member by at least one power source.

Another aspect of the invention involves a method of illuminating an object associated with a portable electronic or computing device having a port in electrical connection with at least one power source. The method includes providing an electroluminescent (EL) illumination apparatus comprising a plug for plugging the apparatus into the port and at least one EL member; plugging the plug of the EL apparatus into the port of the portable electronic or computing device; and lighting at least one EL member with the power source to illuminate an object associated with the portable electronic or computing device.

An additional aspect of the invention involves a method of illuminating an object associated with a portable electronic or computing device having a port in electrical connection with at least one power source. The method includes providing an illumination apparatus including a plug to plug the apparatus into the port of the portable electronic or computing device, a body connected to the plug, and an illumination device connected to the plug, the illumination device including a top portion with a layer having a translucent advertising mark; plugging the plug into the port of the electronic or computing device; and illuminating the translucent advertising mark with the illumination device by supplying power to the illumination device from the power source.

A further aspect of the invention involves an adapter for a portable electronic or computing device having a first port in electrical connection with at least one power source, the first port including a top, bottom, left side, and right side. The adapter includes an adapter body including a first plug with a top, bottom, left side, and right side with a geometry corresponding to the geometry of the top, bottom, left side, and right side of the first port of the portable electronic or computing device and adapted to mate therewith, a second port having a top, bottom, left side, and right side with a geometry corresponding to the geometry of the top, bottom, left side, and right side of the first port of the portable electronic or computing device and adapted to receive a second plug of an electronic or computing appliance. The second port is oppositely oriented with respect to the first port when the first plug is plugged into the first port of the portable electronic or computing device.

A still further aspect of the invention involves a method of using an adapter with a portable electronic or computing device having a first port in electrical connection with at least one power source, the first port including a top, bottom, left side, and right side. The method includes providing an adapter body including a first plug with a top, bottom, left side, and right side with a geometry corresponding to the geometry of the top, bottom, left side, and right side of the first port of the portable electronic or computing device and adapted to mate therewith, a second port having a top, bottom, left side, and right side with a geometry corresponding to the geometry of the top, bottom, left side, and right side of the first port of the portable electronic or computing device and adapted to receive a second plug of an electronic or computing appliance; and plugging the first plug of the adapter body into the first port of the portable electronic or computing device so that the second port is oppositely oriented with respect to the first port.

These and further objects and advantages will be apparent to those skilled in the art in connection with the drawing and the detailed description of the preferred embodiment set forth below.

DETAILED DESCRIPTION OF THE PREFERRED EMBODIMENT

Figure 1:
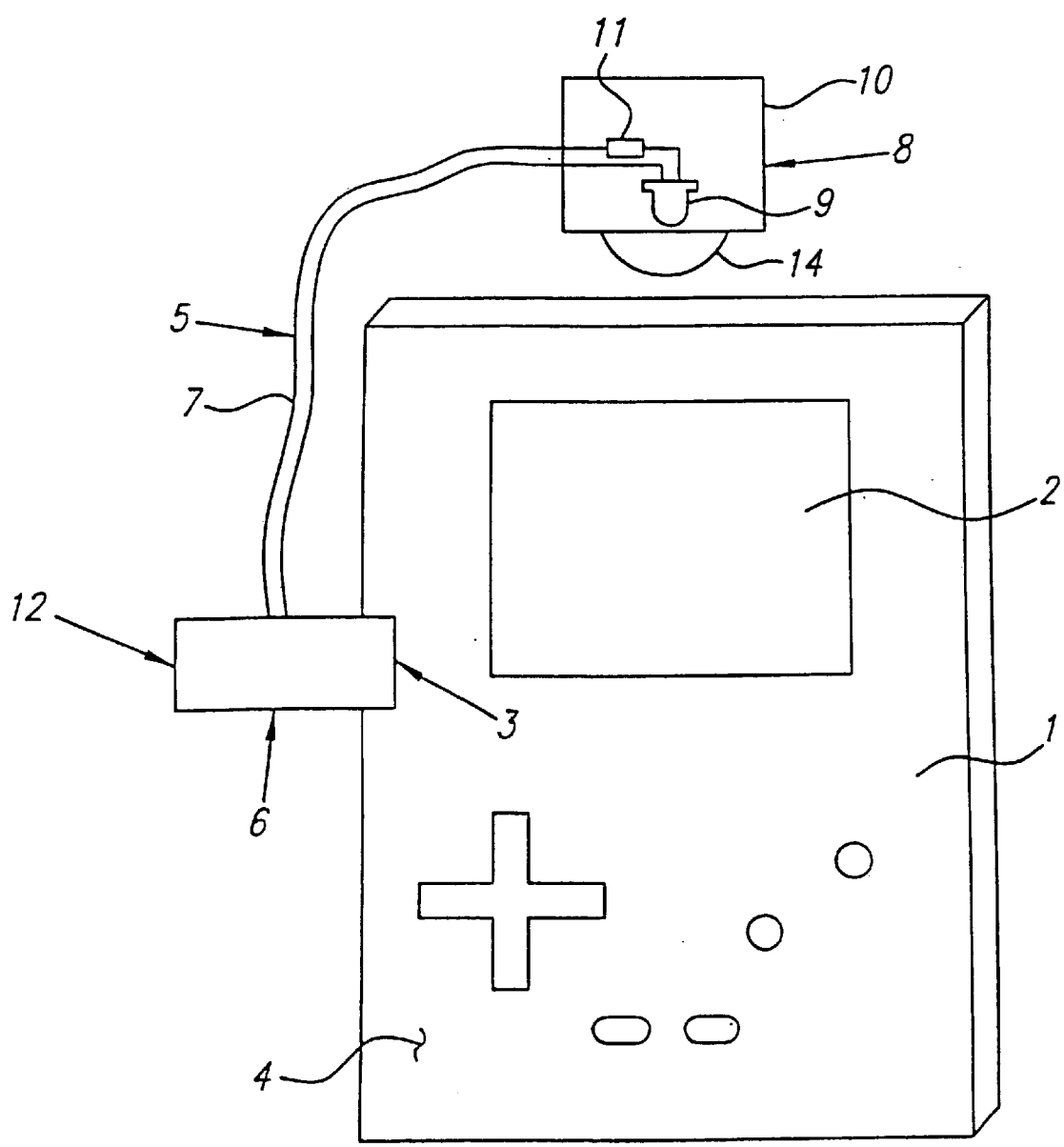
FIG. 1 is a schematic representation of an embodiment of the present invention.

FIG. 1 illustrates how a preferred embodiment of the present invention can be used with a portable electronic game device, such as a GAME BOY™ device. Although this drawing depicts a portable electronic game device, the invention is adaptable to any portable electronic device that has a utility power jack in electrical connection with a power source, such as, but not by way of limitation, a cellular phone, a video camera, a personal digital assistant (PDA), and a remote control.

In the preferred embodiment shown in FIG. 1, the electronic device 1 has a viewing screen 2, a power source and a utility power jack. The power source and utility power jacks are not visible and are shown generally as 3 and 4, because their location and configuration will vary depending upon the design of a given portable electronic device. The power source 3 may be self-contained, such as batteries in a battery compartment. The power source 3 may or may not be augmented by a plug-in capability to a non-portable power source, such as a wall outlet.

The illumination apparatus, shown generally as 5, includes a plug, shown generally as 6, for plugging the illumination apparatus 5 into the utility power jack 4 of the electronic device 1. The configuration of the plug 6 may be designed so as to mate with the utility power jack 4 and create a mechanical and electrical connection between the utility power jack 4 and the plug 6 when the apparatus 5 is plugged into the electronic device 1.

The illumination apparatus 5 also includes a body 7 and an illumination device 8. The body 7 connects the illumination device 8 to the plug 6, and the body is preferably comprised of a flexible arm. The illumination device 8 is electrically connected to the utility power jack 4 through the plug 6 and the body 7 so that the illumination device 8 is powered by the power source 2 when the illumination apparatus 5 is plugged into the electronic device 1. The electrical connection between the illumination device 8 and the plug 6 can be by any suitable means, such as by a wire (not shown). It is especially preferred that the body 7 can be adjusted, when the apparatus 5 is plugged into the utility power jack 4, to adjust the height and/or the angle of the illumination device 8 relative to the electronic device 1.

In the preferred embodiment of the present invention, the illumination device 8 is comprised of a light emitting diode ("LED") 9 housed in a case housing 10. The housing 10 can also include suitable electronics, such as a resistor 11, or a regulator (not shown) for varying the intensity of light given off by the LED. In an especially preferred embodiment, the LED 9 is a white light diode. The housing can also include additional features, such as, but not by way of limitation, a diffuser lens 9, a magnifier, a reflector, and/or a mirror.

When the plug 6 of the illumination apparatus 5 is plugged into the utility power jack 4 of the electronic device 1, it necessarily occupies the connection that the utility power jack 4 would otherwise provide to a user of the electronic device 1. Because a user of the electronic device 1 might need to connect some other device to the utility power jack 4, it is especially preferred that the plug 6 be constructed so as to include a second utility power jack 12. The second utility power jack 12 is adapted to receive a second plug of an accessory and provide a mechanical and electrical connection for the second plug equivalent to that which is provided by the utility power jack 4. Thus, the second utility power jack 12 will provide electrical communication for the second plug with the utility power jack 4 when the second plug is plugged into the plug 6 and the plug 6 is plugged into the utility power jack 4. The plug 6 of the illumination apparatus 5 may be coupled to the jack 4 of the electronic device 1 indirectly, e.g., through a connection cable, adapter, chain of accessories including plugs/jacks, etc. The second plug may be a plug of any accessory including a plug, e.g., a connection cable, another illumination apparatus 5, adapter, chain of accessories including plugs/jacks, etc.

The present invention is also adaptable to a portable computing device with a display screen that is not illuminated by the portable computing device. In such an embodiment, the illumination apparatus is plugged into a utility port of the computing device in electrical connection with a power source instead of the utility power jack 4 of the electronic device 1. In such a device, the utility port can be any port that allows connection of additional products or communication devices, or cables, or any additional accessory or product. The illumination apparatus can have a second utility port adapted to receive a second plug that is in electrical communication with the utility port when the second plug is plugged into the plug and the plug is plugged into the utility port. In all other respects, the structure and function of the illumination apparatus would be the same as for the illumination apparatus 5 described above in connection with electronic device 1.

Figure 2:
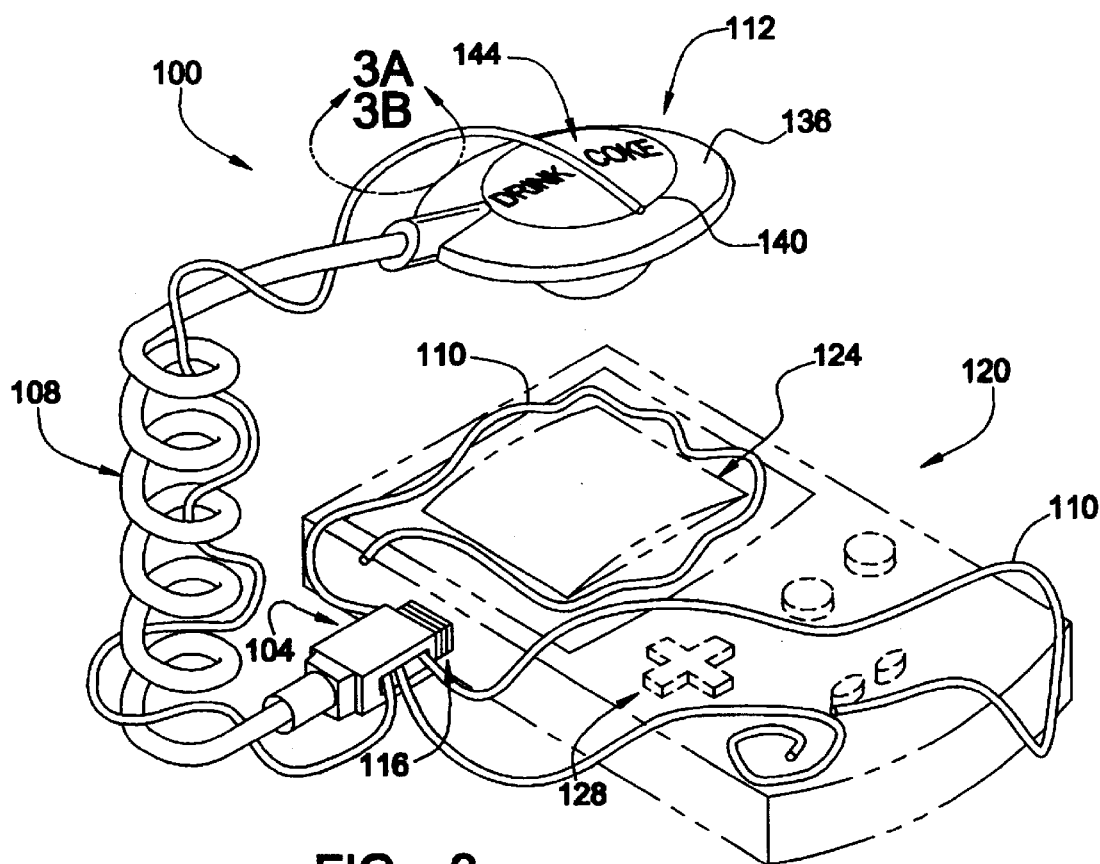
FIG. 2 is a perspective view of another embodiment of the present invention.

With reference to FIG. 2 an electroluminescent illumination apparatus 100 constructed in accordance with an embodiment of the invention will now be described. The apparatus 100 includes a plug 104, a helical body 108 and one or more electroluminescent ("EL") members 110 extending from the plug 104, and an illumination device 112 at one end of the body 108. The plug 104 preferably plugs into a jack or port 116 of a portable electronic or computing device 120. In alternative embodiments, the EL illumination apparatus 100 may plug into a port 116 of a nonportable electronic or computing device. Further, the EL illumination apparatus 100 may be incorporated into a portable or non-portable electronic or computing device. The plug 104 and illumination device 112 are similar to the plug 6 and the illumination device 8 described above with respect to FIG. 1 and are, therefore, not described in further detail. The coiled body 108 is preferably made of a flexible, bendable material so that it may be bent to a desired configuration for optimal illumination of a screen 124 or other object associated with the electronic or computing device 120, e.g., a control section 128, associated video game user guides, reading publication, notes, etc. Although the body 108 is shown and described as being coiled or helical, in alternative embodiments, the body may have other curvilinear, linear, or rectilinear shapes, e.g., serpentine, crenellated, wave-like, toothed, straight, etc.

The one or more EL members 110 extending from the plug 104 are in electrical communication therewith so that the EL member(s) 110 are illuminated when the plug 104 is in electrical communication with a power source of the electronic or computing device 120 via the port 116. The EL member(s) 110 are preferably EL wires or tubes. Each EL wire is a light emitting capacitor. The capacitive structure is formed by a light emitting electroluminescent semiconductor layer sandwiched between two conductive electrodes. A copper wire serves as a core electrode. The copper wire is coated with several layers of dielectric and semiconductor materials which together form a coaxial construction. A transparent conductive layer is then added with two thin copper wires which serve as the second electrode and when AC voltage is applied between the two electrodes and exceeds a well-defined threshold value, the semi-conductor material between the two electrodes emits light. The EL member(s) 110 are preferably LyTec™ Electroluminescent wires sold by ELAM Electroluminescent Industries Ltd. of Jerusalem, Israel.

The EL member(s) 110 are preferably thin, flexible, durable, non-toxic, safe, UV resistant, use a minimal amount of electricity, and come in a wide variety of colors such as, but not by way of limitation, yellow, orange, green, coral, blue, aqua, purple, lime, red. One or more of the EL member(s) 110 may have one or more of these colors. Preferably, the EL member(s) may be bendable and shapeable, similar to the body 108, so that the member(s) 110 may be shaped to a desired configuration on and/or around (or partially around) the device 128. For example, different color member(s) 110 may be bent and oriented into a braided configuration. The member(s) 110 may include a sticky backing to assist in fixing the member(s) 110 to the device 120. Although the EL member(s) 110 are described as wires or tubes, in alternative embodiments, the EL member(s) 110 may have other configurations, e.g. thin, flat bands. The EL member(s) 110 may serve numerous purposes such as, but not by way of limitation, the EL member (s) 110 may help secure the plug 104 and the rest of the illumination apparatus 100 to the device 120, the EL member(s) 110 may be used to illuminate the display 124, the device 120 in general, the control section 128, one or more objects associated with or nearby the device 120, and the EL member(s) 110, especially when lit, may be used for ornamental purposes.

The plug 104 (or another compartment (not shown) adjacent the plug 104) may house a controller comprising hardware, e.g., electronics, and/or software for causing the EL member(s) 110 to flash, blink, flicker, or light intermittently, flash, blink, flicker, or light simultaneously, flash, blink, flicker, or light in a random pattern or order, flash, blink, flicker, or light in a predetermined pattern or order, brighten and/or dim the lighting of the member(s) 110, flash, blink, flicker, or light based on activity occurring with the electronic or computing device 120. For example, if the electronic or computing device 120 is a handheld video game device such as a GAME BOY™, signals from the video game being played and/or from the device 120 may be used by the controller to control lighting of the EL member(s) 110, e.g., a green EL member 110 flashes, blinks, flickers, or lights when something good happens in the game and a red EL member 110 flashes, blinks, flickers, or lights when something bad happens in the game. The controller may include a sequencer with speed control, on/off control, reverse direction control. The controller or other electronics associated with the EL member(s) 110 preferably includes an inverter to convert DC power from the power source of the device 120 to AC power for lighting the EL member(s) 110. The plug 104 (or other compartment) may include a switch to switch the illumination apparatus 100 on or off. All of the above could be built into the device 120 to control the EL member(s) 110.

In one or more further embodiments, the EL illumination apparatus 100 may include one or more of the following: 1) the EL illumination apparatus 100 does not include the body 108 and illumination device 112, 2) the body 108 includes one or more EL members 110 (e.g., multiple, different colored EL members 110 parallel with a bendable copper wire 130 inside of a plastic shell 132 (FIG. 4A), multiple, different colored EL members 110 parallel with and/or coiled around the bendable copper wire 130 (FIG. 4B)), 3) the one or more EL members 110 include a bendable copper wire, 4) the EL illumination apparatus 100 includes one or more EL members 110 twisted around the body 108, 5) the EL illumination apparatus 100 includes one or more EL members 110, preferably emitting white light, that surround the display 110 or are in a frame for lighting the display 124, 6) the EL illumination apparatus 100 includes its own power source and does not include a plug for drawing power from the device 120 through the port 116, 7) the one or more EL members 110 are integrated with the device 120, and 8) the illumination device 112 houses one or more EL members 110, preferably emitting white light, for illumination purposes.

In another embodiment, a top portion 136 of the illumination device 112 includes one or more translucent layers 140 (e.g., sticker(s), label(s), thin film member(s), printing(s)), preferably with a translucent advertising mark (e.g., logo, trademark, graphics, or other advertising) 144 therein. Alternatively, the material making up the top portion 136 may have a translucent advertising mark 144 incorporated therein.

In use, light emitted from the illumination device 112 by the light source(s) (e.g., LED(s), EL member(s) 110) for illuminating the display 110 or other object(s) associated with the device 120 also illuminates the translucent advertising mark 144, creating a neat, lighted advertising effect. In further embodiment, the translucent layer(s) 140 may be applied to other areas of the apparatus 100 such as, but not by way of limitation, the body 108 and the EL member(s) 110. In another embodiment, the translucent layer 140 may include one or more EL members 110.

Further, one or more lightable translucent layers 140 may be attached to other objects such as, but not by way of limitation, a person's clothing. In such an embodiment, the sticker may include wiring to connect a light source(s) (e.g., LED(s), EL member(s)) associated with the layer(s) 140 to the plug 104 for powering the light source(s) by the device 120. The layer(s) 140 may also be powered by a separate power source associated with the layer(s) 140, e.g., one or more small watch-type batteries or other flat-type batteries.

The light source(s) illuminating the translucent advertising 144 may be controlled by a controller comprising hardware, e.g., electronics, and/or software for causing the light source(s), and, hence, the advertising 144, to flash, blink, flicker, or light intermittently, flash, blink, flicker, or light simultaneously, flash, blink, flicker, or light in a random pattern or order, flash, blink, flicker, or light in a predetermined pattern or order, brighten and/or dim the lighting of the member(s) 110, flash, blink, flicker, or light based on activity occurring with the electronic or computing device 120.

For example, if the electronic or computing device 120 is a handheld video game device such as a GAME boy™, signals from the video game being played and/or from the device 120 may be used by the controller to control lighting of the light source(s), e.g., a green light flashes, blinks, flickers, or lights when something good happens in the game and a red light flashes, blinks, flickers or lights when something bad happens in the game.

In another example, the electronic or computing device 120 may be a pager, cellphone, or the like, and signals indicating an incoming communication, e.g., call, page, may be used by the controller to control lighting of the light source(s) to notify the user of the incoming communication. The controller may communicate with the light source through wiring or through a wireless mechanism, e.g., transmitter/receiver combination.

In use, the plug 104 of the EL illumination apparatus 100 is plugged into the port 116 of the device 120 so that when the device 120 is powered on, the EL illumination apparatus 100 is also powered on, causing the light source(s) of the illumination device 112 to illuminate and/or the EL member(s) 110 to illuminate. The EL member(s) 110 may be bent to a desired configuration on or at least partially around the device 120 and/or body 108. The body 108 may also be bent to a desired configuration for optimal lighting of any object(s) associated with the device 120. In another embodiment, the EL illumination apparatus 100 may be powered without having to activate the device 120. In this embodiment, an on/off switch associated with the apparatus 100 may be used for controlling illumination of the apparatus 100.

Figure 4A:
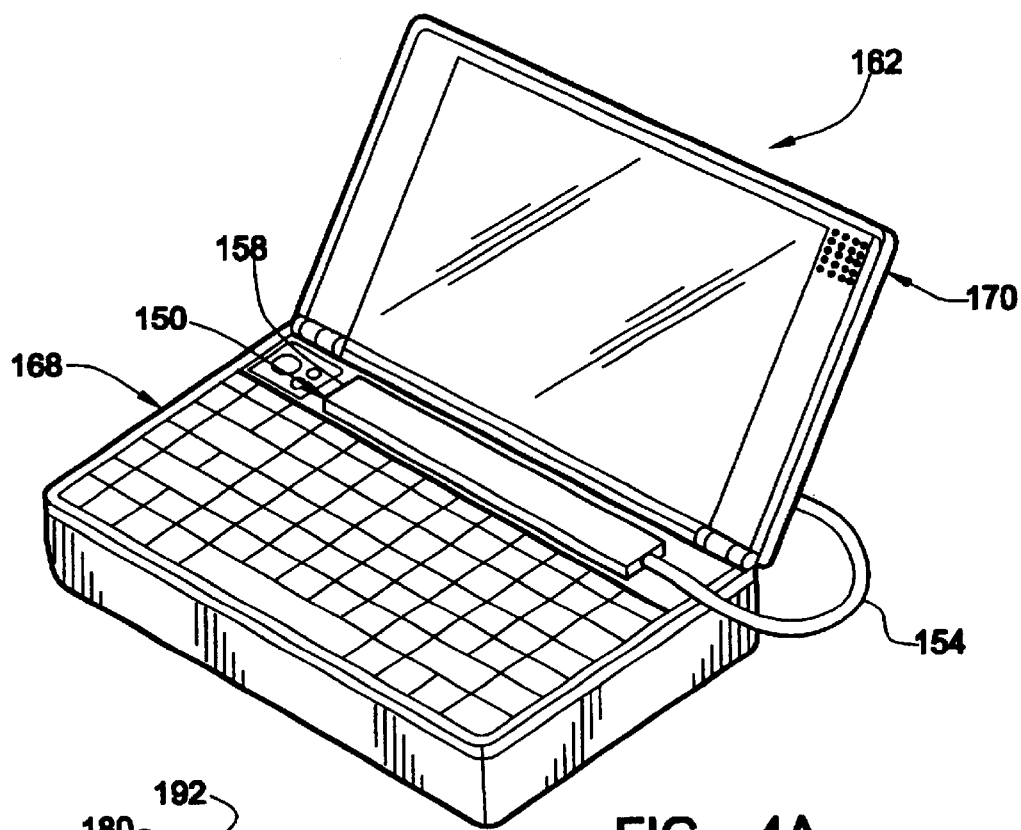
FIG. 4A is a perspective view of another embodiment of an electroluminescent apparatus shown in conjunction with a laptop computer.

With reference to FIG. 4A, an electroluminescent illumination apparatus 150 constructed in accordance with another embodiment of the invention will now be described. The apparatus 150 includes a serial port plug not shown, a flexible cord or body 154, and an EL member 158. The EL member 158 may be flat or raised, but is preferably flat and in the shape of a flat band or bar. The apparatus 150 is shown in conjunction with a laptop computer 162. The EL member 158 may include a sticky backing (e.g., adhesive backing, hook or loop fasteners of a hook and loop fastener arrangement) and/or may be shapeable to attach the EL member 158 to a surface of the laptop computer 162 for illuminating a keyboard 166. Although the EL apparatus 150 shown includes a single EL member 158, in an alternative embodiment, the EL apparatus 150 may include multiple EL members 158.

In use, the plug of the EL apparatus 150 is plugged into a serial port of the laptop computer 162 and the EL member 158 is adhered and/or formed to a desired shape to connect the EL member 158 to the laptop computer 162. Because the EL member 158 is preferably flat, a screen 170 may be closed without the EL member 158 interfering therewith. The EL member 158 is powered by the power source of the laptop computer 162 for illuminating the keyboard 166 and/or other object associated with the computer 162.

Figure 4B:
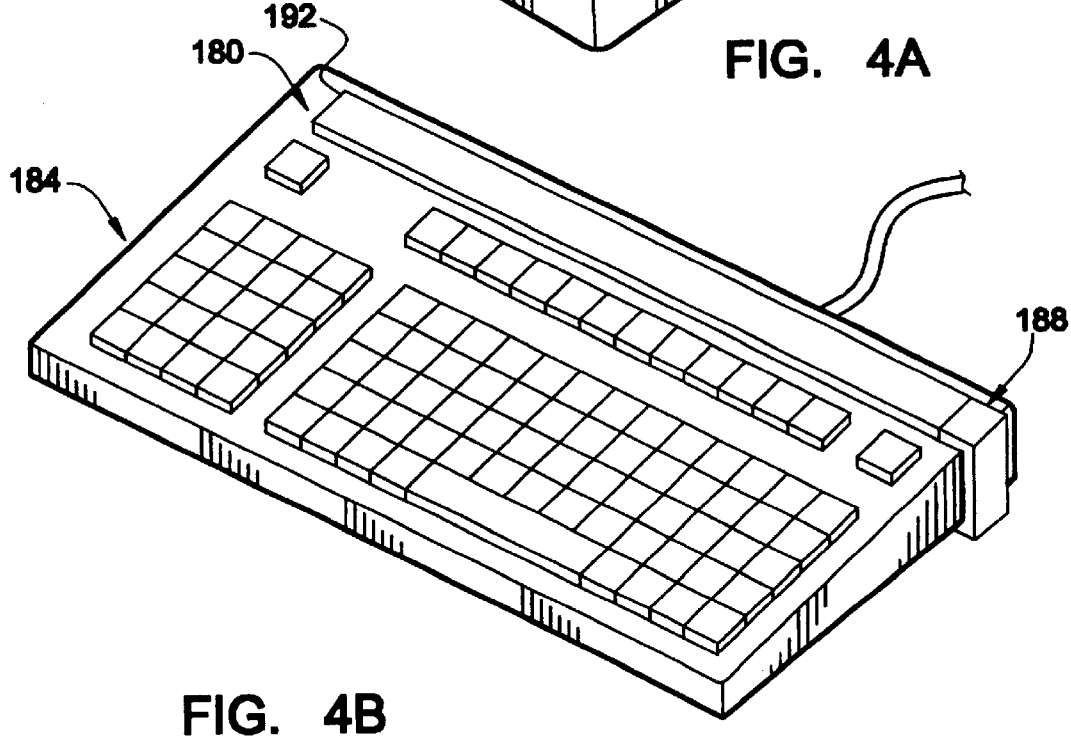
FIG. 4B is a perspective view of an additional embodiment of an electroluminescent apparatus shown in conjunction with a laptop computer.

With reference to FIG. 4B, an embodiment of an EL apparatus 180 is similar to the EL apparatus 150 described above with respect to FIG. 4A, except the EL apparatus 180 is shown attached to a separate computer keyboard 184. Also, the EL apparatus 180 includes its own power source carried within a power source housing 188. The power source powers a connected EL member 192 for illuminating the keyboard 184 and/or other associated object.

Figure 5:
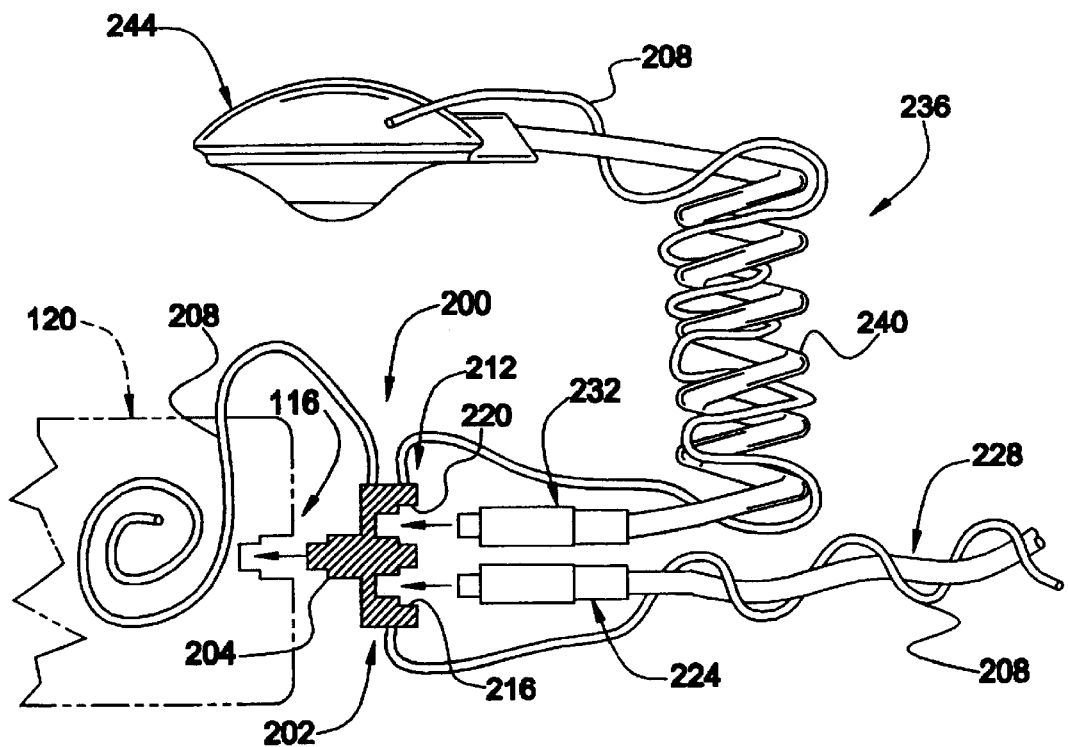
FIG. 5 is a side-elevational view of a further embodiment of the present invention.
Figure 3A:
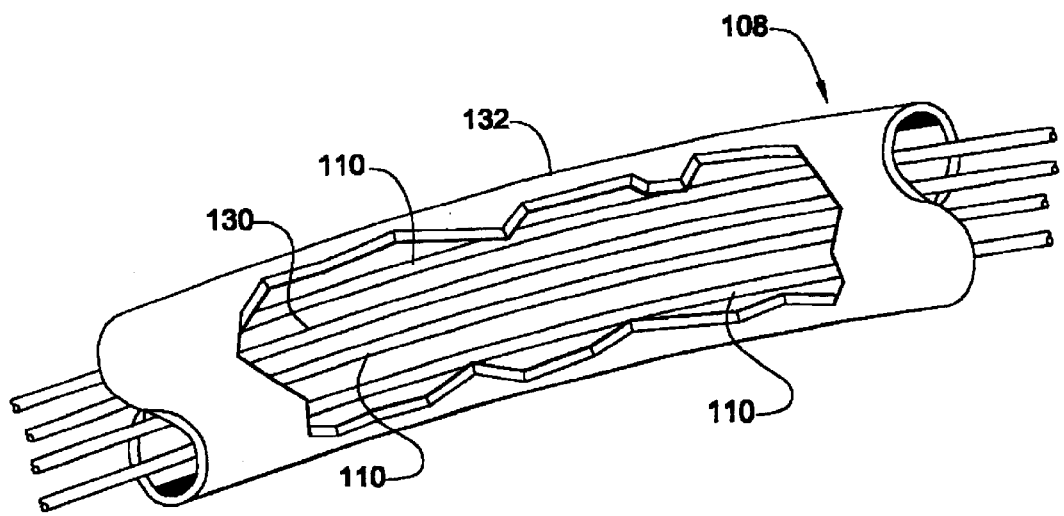
FIG. 3A is a perspective view of an alternative embodiment of an electroluminescent body with a portion of the body cut-away.
Figure 3B:
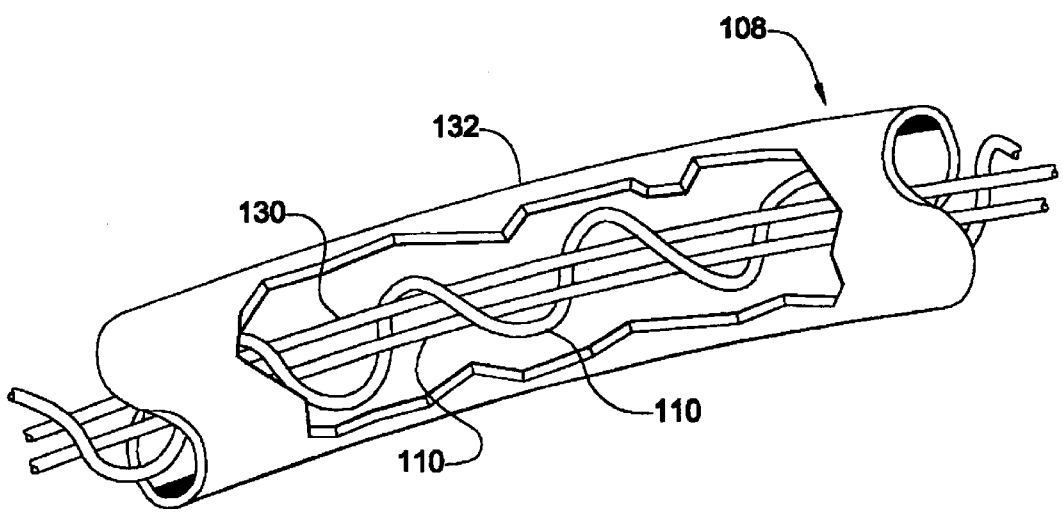
FIG. 3B is a perspective view of a further embodiment of an electroluminescent body.

With reference to FIG. 5, an EL illumination pass-thru apparatus 200 constructed in accordance with another embodiment of the invention will now be described. The pass-thru apparatus 200 includes an adapter 202 having a plug 204, one or more electroluminescent ("EL") members 208, and one or more jacks or ports 212. Similar to the plug 104 described above with respect to FIG. 2, the plug 204 of the adapter 202 plugs into the jack or port 116 of the electronic or computing device 120. The EL member(s) 208 are similar to the EL member(s) 110 described above with respect to FIG. 2 and will therefore not be described in further detail; the description of the EL member(s) 110 with respect to FIG. 2 is incorporated herein. The one or more ports 212 may comprise a first port 216 and a second port 220. Although two ports 212 are shown, the EL illumination apparatus 200 may include other numbers of ports, e.g., 1, 3, 4, etc. The ports 212 may receive plugs of other devices. For example, but not by way of limitation, the port 216 may receive a plug 224 of a connector cable 228. The connector cable 228 may be used to connect any two electronic or computing appliances such as, but not by way of limitation, two handheld video game devices for communicating the appliances and/or powering at least one of the appliances. The port 220 may receive a plug 232 of an electronic or computing appliance such as, but not by way of limitation, an illumination apparatus 236. The plug 232, a body 240, and an illumination device 244 of the exemplary illumination apparatus 236 shown in FIG. 5 is similar to the plug 104, body 108, and illumination device 112 described above with respect to FIG. 2. In addition to wrapping the EL member(s) around or partially around the electronic or computing device 120, the EL member(s) 208 may be wrapped around or partially around the cable 228 and/or the illumination apparatus 236.

In use, the plug 204 of the adapter 202 is plugged into the port 116 of the device 120 so that when the device 120 is powered on, the pass-thru apparatus 200 is also powered on, causing the EL member(s) 208 to illuminate. One or more appliances may communicate with and/or be powered by the device 120 by plugging the plug(s) 224, 232 into the port(s) 216, 220. The EL member(s) 208 may be bent to a desired configuration on or at least partially around the device 120, cable 228, illumination apparatus 236, and/or other objects. In another embodiment, the EL illumination pass-thru apparatus 200 may be powered without having to activate the device 120. Accordingly, an on/off switch associated with the apparatus 200 may be used for powering the apparatus 200.

In an alternative embodiment, the pass-thru apparatus 200 may not include the one or more EL members 208. Thus, the apparatus 200 may serve strictly as an adapter for connecting one or more appliances such as, but not by way of limitation, the illumination apparatus 236 with the device 120 for communication and/or powering the appliance(s). For example, but not by way of limitation, the pass-thru apparatus 200 may be used to couple the illumination apparatus 236 with the GAME BOY™ ADVANCE handheld video game device for powering the illumination apparatus 236. This handheld video game device includes a first port in electrical connection with at least one power source. The first port includes a top, bottom, left side, and right side. An adapter for use with this handheld video game device includes an adapter body with a first plug having a top, bottom, left side, and a right side with a geometry corresponding to the geometry of the top, bottom, left side, and right side of the first port of the portable electronic or computing device and is adapted to mate therewith. The adapter body includes a second port with a top, bottom, left side, and right side with a geometry corresponding to the geometry of the top, bottom, left side, and right side of the first port of the portable electronic or computing device and adapted to receive a second plug of an electronic or computing appliance. The second port is oppositely oriented with respect to the first port when the first plug is plugged into the first port of the portable electronic or computing device. The second port may be one of many ports of the adapter body.

In use, the first plug of the adapter is plugged into the first port of the portable electronic or computing device so that the second port is oppositely oriented with respect to the first port. Then, the second plug of the electronic or computing appliance is plugged into the second port of the adapter. Alternatively, the second plug may be plugged into the second port before or at the same time the first plug is plugged into the first port.

It will be readily apparent to those skilled in the art that still further changes and modifications in the actual concepts described herein can readily be made without departing from the spirit and scope of the invention as defined by the following claims.

What is claimed is:

1. A method of illuminating an object associated with a portable electronic or computing device having a port in electrical connection with at least one power source, comprising:
   providing an electroluminescent (EL) illumination apparatus comprising a plug for plugging the apparatus into the port and at least one EL member;
   plugging the plug of the EL apparatus into the port of the portable electronic or computing device; and
   lighting at least one EL member with the power source to illuminate an object associated with the portable electronic or computing device.

2. The method of claim 1, wherein the portable electronic or computing device is a handheld video game device.

3. The method of claim 1, wherein the portable electronic or computing device is a personal digital assistant (PDA).

4. The method claim 1, wherein the plug has at least one port adapted to receive a second plug of an electronic or computing appliance, and the method further includes plugging the second plug of the electronic or computing appliance into at least one port of the plug to perform at least one of powering the appliance and communicating the device with the appliance.

5. The method of claim 1, wherein at least one EL member is bendable, and the method further includes bending at least one EL member at least partially around the device.

6. The method of claim 5, wherein bending at least one EL member at least partially around the device retains the EL illumination apparatus to the device.

7. The method of claim 1, wherein the portable electronic or computing device has a display screen, and at least one EL member includes a frame to house at least one EL member, and the method further including illuminating the screen of the device with at least one EL member in the frame.

8. The method of claim 1, wherein the portable electronic or computing device has a display screen, and the method further including illuminating the screen of the device with at least one EL member.

9. The method of claim 1, wherein the portable electronic or computing device has an input area to input information into the device, and the method further including illuminating the input area of the device with at least one EL member.

10. The method of claim 1, wherein at least one EL member includes a sticky surface to stick at least one EL member to the device.

11. The method of claim 1, wherein the EL illumination apparatus includes a body connected to the plug and an illumination device connected to the body, the illumination device adapted to illuminate an object associated with the portable electronic or computing device.

12. The method of claim 11, wherein the body includes at least one EL member.

13. The method of claim 11, wherein at least one EL member at least partially surrounds the body.

14. The method of claim 11, wherein the illumination device includes at least one EL member.

15. The method of claim 11, wherein the illumination device includes at least one light emitting diode ("LED").

16. The method of claim 15, wherein at least one LED is at least one white LED.

17. The method of claim 1, wherein at least one EL member includes multiple EL members, at least two of which are different colors.

18. The method of claim 1, wherein at least one EL member includes multiple EL members, and the EL illumination apparatus further includes electronics to control said multiple EL members to perform a function from the group consisting of flashing the EL members, flashing the EL members simultaneously, flashing the EL members in a predetermined order, flashing the EL members in a random order, lighting the EL members in a predetermined order, lighting the EL members in a random order, and lighting the EL members in response to signals transmitted from the electronic or computing device.

19. The method of claim 11, wherein the illumination device includes a top portion with a translucent advertising mark, and the method further includes illuminating said translucent advertising mark with said illumination device.

20. The method of claim 19, wherein a sticker carries said translucent advertising mark.

21. The method of claim 19, wherein the EL illumination apparatus further includes electronics to control illumination of said illumination device to perform a function from the group consisting of flashing the illumination device, flashing the illumination device in a predetermined order, flashing the illumination device in a random order, lighting the illumination device with different-colored lighting, and lighting the illumination device in response to signals transmitted from the electronic or computing device.

22. An electroluminescent illumination apparatus for illuminating an object associated with a portable electronic or computing device having a port in electrical connection with at least one power source, comprising:
   at least one electroluminescent (EL) member to illuminate an object associated with a portable electronic or computing device;
   a plug connected to at least one EL member for plugging the apparatus into the port of the portable electronic or computing device for powering at least one EL member by at least one power source.

23. The apparatus of claim 22, wherein the portable electronic or computing device is a handheld video game device.

24. The apparatus of claim 22, wherein the portable electronic or computing device is a personal digital assistant (PDA).

25. The apparatus of claim 22, wherein the plug has at least one port adapted to receive a second plug of an electronic or computing appliance to perform at least one of communicating the device with the electronic or computing appliance and powering the electronic or computing device with the power source.

26. The apparatus of claim 22, wherein at least one EL member is bendable.

27. The apparatus of claim 22, wherein at least one EL member retains the EL illumination apparatus to the device.

28. The apparatus of claim 22, wherein the portable electronic or computing device includes a display screen, and said apparatus further includes a frame to hold at least one EL member and mount to the device so that at least one EL member may illuminate the screen of the device.

29. The apparatus of claim 22, wherein the portable electronic or computing device has a display screen, and at least one EL member is adapted to illuminate the screen.

30. The apparatus of claim 22, wherein the portable electronic or computing device has an input area to input information into the device, and at least one EL member is adapted to illuminate the input area.

31. The apparatus of claim 22, wherein at least one EL member includes a sticky surface to stick at least one EL member to the device.

32. The apparatus of claim 22, wherein the EL illumination apparatus includes a body connected to the plug and an illumination device connected to the body, the illumination device is adapted to illuminate an object associated with the portable electronic or computing device.

33. The apparatus of claim 32, wherein the body includes at least one EL member.

34. The apparatus of claim 32, wherein at least one member at least partially surrounds the body.

35. The apparatus of claim 32, wherein the illumination device includes at least one EL member.

36. The apparatus of claim 32, wherein the illumination device includes at least one light emitting diode ("LED").

37. The apparatus of claim 36, wherein at least one LED is at least one white LED.

38. The apparatus of claim 22, wherein at least one EL member includes multiple EL members, at least two of which are different colors.

39. The apparatus of claim 22, wherein at least one EL member includes multiple EL members, and the EL illumination apparatus further includes electronics to control said multiple EL members to perform a function from the group consisting of flashing the EL members, flashing the EL members simultaneously, flashing the EL members in a predetermined order, flashing the EL members in a random order, lighting the EL members in a predetermined order, lighting the EL members in a random order, and lighting the EL members in response to signals transmitted from the electronic or computing device.

40. The apparatus of claim 32, wherein the illumination device includes a layer with a translucent advertising mark adapted to be illuminated by said illumination device.

41. The apparatus of claim 40, wherein said layer is a sticker that carries said translucent advertising mark.

42. The apparatus of claim 40, wherein the EL illumination apparatus further includes electronics to control illumination of said illumination device to perform a function from the group consisting of flashing the illumination device, flashing the illumination device in a predetermined order, flashing the illumination device in a random order, lighting the illumination device with different-colored lighting, and lighting the illumination device in response to signals transmitted from the electronic or computing device.

43. A method of illuminating an object associated with a portable electronic or computing device having a port in electrical connection with at least one power source, comprising:

providing an illumination apparatus including a plug to plug the apparatus into the port of the portable electronic or computing device, a body connected to the plug, and Ian illumination device connected to the plug, the illumination device including a top portion with a layer having a translucent advertising mark;

plugging the plug into the port of said electronic or computing device; and illuminating said translucent advertising mark with said illumination device by supplying power to said illumination device from said power source.

44. The method of claim 43, wherein said illumination device includes at least one LED.

45. The method of claim 44, wherein at least one LED includes at least one white LED.

46. The method of claim 43, wherein said illumination device includes at least one EL member.

47. The method of claim 43, wherein the illumination apparatus further includes electronics to control illumination of said illumination device to perform a function from the group consisting of flashing the illumination device, flashing the illumination device in a predetermined order, flashing the illumination device in a random order, lighting the illumination device with different-colored lighting, and lighting the illumination device in response to signals transmitted from the electronic or computing device.

48. An adapter for a portable electronic or computing device having a first port in electrical connection with at least one power source, the first port including a top, bottom, left side, and right side, the adapter comprising:

an adapter body including a first plug with a top, bottom, left side, and right side with a geometry corresponding to the geometry of the top, bottom, left side, and right side of the first port of the portable electronic or computing device and adapted to mate therewith, a second port having a top, bottom, left side, and right side with a geometry corresponding to the geometry of the top, bottom, left side, and right side of the first port of the portable electronic or computing device and adapted to receive a second plug of an electronic or computing appliance, wherein said second port is oppositely oriented with respect to the first port when said first plug is plugged into the first port of the portable electronic or computing device.

49. The adapter of claim 48, wherein said second port is one of one or more ports of said adapter body.

50. A method of using an adapter with a portable electronic or computing device having a first port in electrical connection with at least one power source, the first port including a top, bottom, left side, and right side, the method comprising:

providing an adapter body including a first plug with a top, bottom, left side, and right side with a geometry corresponding to the geometry of the top, bottom, left side, and right side of the first port of the portable electronic or computing device and adapted to mate therewith, a second port having a top, bottom, left side, and right side with a geometry corresponding to the geometry of the top, bottom, left side, and right side of the first port of the portable electronic or computing device and adapted to receive a second plug of an electronic or computing appliance;

plugging said first plug of said adapter body into the first port of the portable electronic or computing device so that said second port is oppositely oriented with respect to the first port.

51. The method of claim 50, further including plugging a second plug of an electronic or computing appliance into said second port.

52. The method of claim 50, wherein said second port is one of one or more ports of said adapter body.

53. An adapter for use with a portable handheld video game device having a utility port in electrical connection with a power source, comprising:

an adapter body to couple the utility port of the portable handheld video game device with one or more accessories, the adapter bodying including a plug to couple with the utility port of the portable electronic or computing device and one or more ports to receive one or more plugs to couple the adapter body with one or more accessories.

54. The adapter of claim 53, further including one or more illumination devices carried by the adapter body and to be electrically connected to the utility port of the portable handheld video game device via at least the plug.

55. The adapter of claim 54, wherein the one or more illumination devices include one or more EL members.

56. The adapter of claim 53, wherein the one or more ports include a first port to receive a plug of an electronic or computing appliance and a second port to receive a plug of a connector cable for communicating the portable handheld video game device with another portable handheld video game device.

57. The adapter of claim 56, wherein the electronic or computing appliance is an illumination apparatus.

58. A method of using an adapter for a portable handheld video game device having a utility port in electrical connection with a power source, comprising:

providing an adapter having an adapter body to couple the utility port of the portable handheld video game device with one or more accessories, the adapter bodying including a plug to couple with the utility port of the portable electronic or computing device and one or more ports to receive one or more plugs to couple the adapter body with one or more accessories;

coupling the plug of the adapter with the utility port of the portable handheld video game device;

plugging the one or more plugs of the one or more accessories into the one or more ports of the adapter to couple the one or more accessories with the utility port of the portable handheld video game device.

59. The method of claim 58, further including one or more illumination devices carried by the adapter body and to be electrically connected to the utility port of the portable handheld video game device via at least the plug of the adapter.

60. The method of claim 59, wherein the one or more illumination devices include one or more EL members.

61. The method of claim 58, wherein the one or more ports include a first port to receive a plug of an electronic or computing appliance and a second port to receive a plug of a connector cable for communicating the portable handheld video game device with another portable handheld video game device, and the method further includes plugging the plug of the electronic or computing appliance into the first port and plugging the plug of the connector cable into the second port.

62. The method of claim 53, wherein the electronic or computing appliance is an illumination apparatus.

\* \* \* \* \*